(12) United States Patent
Meehan et al.

(10) Patent No.: US 8,885,376 B2
(45) Date of Patent: Nov. 11, 2014

(54) SWITCHING REGULATOR WITH INTEGRATED RESONANT CIRCUIT FOR RIPPLE FILTERING

(75) Inventors: Patrick J. Meehan, Pallaskenry (IE); Thomas Conway, Castletroy (IE); Aldrick Limjoco, Dasmarinas (PH); Donal G. O'Sullivan, Ardnacrusha (IE)

(73) Assignee: Analog Devices, Inc., Norwood, MA (US)

( * ) Notice: Subject to any disclaimer, the term of this patent is extended or adjusted under 35 U.S.C. 154(b) by 258 days.

(21) Appl. No.: 13/484,636

(22) Filed: May 31, 2012

(65) Prior Publication Data
US 2013/0320943 A1    Dec. 5, 2013

(51) Int. Cl.
*H02M 1/14*    (2006.01)
*G05F 1/10*    (2006.01)

(52) U.S. Cl.
CPC .................................. *G05F 1/10* (2013.01)
USPC ............................ 363/147; 333/184; 327/290

(58) Field of Classification Search
CPC .......... H02M 1/14; H02M 1/143; H02M 1/15
USPC ................... 363/147; 323/290; 327/556, 290; 307/105; 333/181, 184
See application file for complete search history.

(56) References Cited

U.S. PATENT DOCUMENTS

| | | | | |
|---|---|---|---|---|
| 4,916,380 A | * | 4/1990 | Burroughs | 323/282 |
| 6,642,811 B2 | * | 11/2003 | Daniels et al. | 333/181 |
| 2009/0146760 A1 | * | 6/2009 | Reefman et al. | 333/184 |

* cited by examiner

*Primary Examiner* — Harry Behm
(74) *Attorney, Agent, or Firm* — Schwegman Lundberg & Woessner, P.A.

(57) ABSTRACT

A switching regulator IC contains both switching regulator circuitry and an inductor and a capacitor connected in parallel to form a resonant circuit having an associated notch filter frequency response arranged such that, when connected to receive the regulated output voltage, the resonant circuit attenuates the ripple component. This is accomplished by matching the resonant notch to the ripple's fundamental frequency, either manually or automatically. In addition, the resonant circuit's inductor and capacitor can act in concert with decoupling capacitors coupled to the load to form a low pass filter which attenuates harmonics of the ripple's fundamental frequency.

23 Claims, 4 Drawing Sheets

SWITCHING REGULATOR WITH INTEGRATED RESONANT CIRCUIT FOR RIPPLE FILTERING

BACKGROUND OF THE INVENTION

1. Field of the Invention

This invention relates generally to switching regulators, and more particularly to circuits designed to filter the ripple component of the regulator's output voltage.

2. Description of the Related Art

The operation of a switching regulator requires that one or more switching elements be switched on and off at a particular switching frequency, which causes the current in the regulator's storage inductor to increase and decrease at the switching frequency. This increasing and decreasing inductor current is largely filtered by the regulator's storage capacitor, but some of this oscillation inevitably appears as a ripple component in the regulator's output voltage.

This ripple component can be particularly problematic when of the switching regulator's output voltage is driving an analog load, as the ripple frequencies typically get through the amplifier, ADC, etc. and corrupt the output. The ripple is not broadband noise; rather, it is coherently related to the switching regulator clock and is harmonically rich as determined by the mark space ratio the regulator is running at.

As ripple is generally undesirable, many systems include circuitry designed to attenuate the ripple component. This usually takes the form of one or more low pass filters made from various manifestations of capacitors, inductors and/or ferrite beads; a linear post-regulator connected between the switching regulator's output and the load might also be used. The attenuation necessary is application-specific, typically depending on the tolerance of the load to ripple.

To achieve a desired level of filtering, it may be necessary to use several series stages. A single inductor and capacitor connected in a low pass configuration can provide 12 dB/octave attenuation; however, attenuation on the order of 30 dB is often necessary. Use of cascaded filter stages can provide additional attenuation, but typically necessitates intermediate buffering. A notch-type filter might also be considered; however, aligning the resonant notch with the fundamental frequency of the ripple component can be difficult.

SUMMARY OF THE INVENTION

A switching regulator which includes an integrated resonant circuit designed to provide ripple filtering is presented.

The approach described herein results in a switching regulator integrated circuit (IC) which includes:

switching regulator circuitry arranged to produce an output which, when coupled to a storage inductor and storage capacitor, form a switching voltage regulator which produces an output voltage when in use, the output voltage including a ripple component; and an inductor and a capacitor connected in parallel to form a resonant circuit having an associated notch filter frequency response, the switching regulator circuitry and the resonant circuit housed within a common IC package;

the switching voltage regulator and resonant circuit arranged such that, when connected to receive the regulated output voltage, the resonant circuit attenuates the ripple component.

As noted above, the ripple component present in a switching regulator's output voltage is coherently related to the switching regulator clock, and has an associated fundamental frequency. The present switching voltage regulator and resonant circuit are arranged such that the resonant notch in the notch filter frequency response and the ripple component's fundamental frequency are matched. A resonant circuit theoretically provides infinite attenuation at its resonant frequency; in practice, when the resonant notch and the fundamental frequency of the ripple are matched, the resonant circuit provides far more ripple attenuation than does a low pass filter configuration. In addition, the inductor and capacitor making up the resonant circuit can act in concert with one or more decoupling capacitors coupled to the load to form a low pass filter which attenuates harmonics of the ripple's fundamental frequency.

The matching can be accomplished manually or automatically. For example, the switching regulator clock frequency and the resonant notch could be manually matched during the manufacturing of the IC. Alternatively, a closed loop system might be employed which, for example, trims the resonant circuit capacitance or inductance until the resonant notch and the switching regulator clock frequency are matched.

As noted above, the inductor and capacitor of the resonant circuit are housed within a common IC package with the switching regulator circuitry. For example, the resonant circuit components could be mounted to a laminate which also supports the switching regulator circuitry die. Alternatively, the IC can be a module-type package, with the switching regulator circuitry die and the inductor and capacitor of the resonant circuit housed within the module. Yet another approach is to mount the resonant circuit components to the IC package's lead frame, which may be specifically designed or modified to accommodate them.

These and other features, aspects, and advantages of the present invention will become better understood with reference to the following drawings, description, and claims.

DETAILED DESCRIPTION OF THE INVENTION

Figure 1:
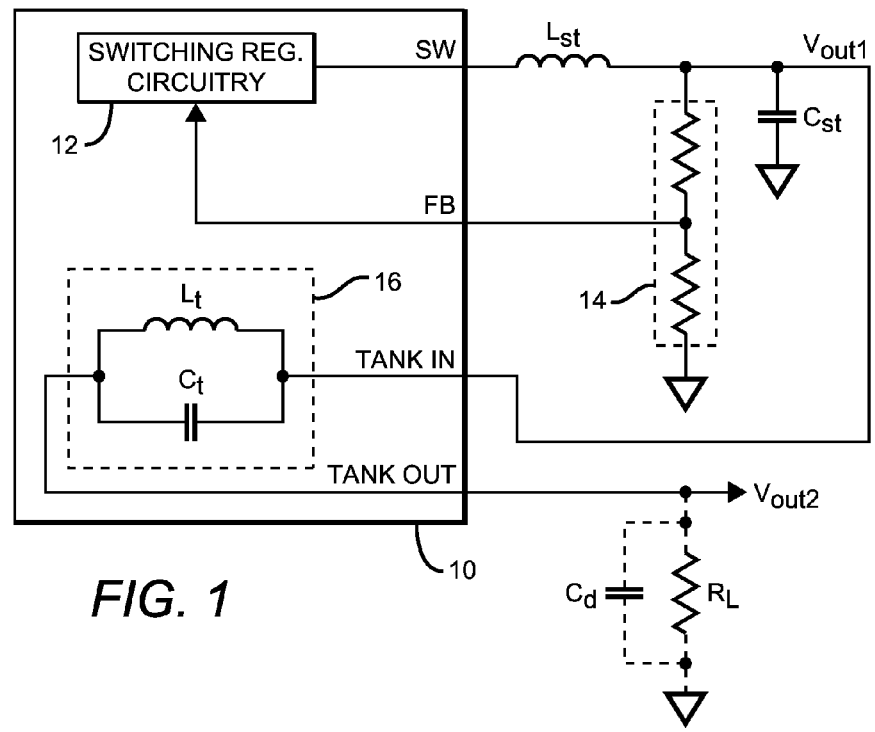
FIG. 1 is a block/schematic diagram illustrating the basic principles of a switching regulator with an integrated resonant circuit per the present invention.

The present system is a switching regulator which includes an integrated resonant circuit designed to provide ripple filtering; a diagram illustrating the basic principles of the invention is shown in FIG. 1. An integrated circuit (IC) 10 contains:

switching regulator circuitry 12 (which would typically include the regulator's switching transistor(s)) and be arranged to produce an output (at SW) which, when coupled to a storage inductor ($L_{st}$) and storage capacitor ($C_{st}$), form a switching voltage regulator which produces an output voltage ($V_{out1}$) when in use. A feedback signal (FB) which varies with $V_{out1}$ (provided by, for example, a voltage divider 14) is typically fed back to regulator circuitry 12 to enable $V_{out1}$ to be regulated. As noted above, the switching regulator operates at a switching frequency ($f_{sw}$) which is derived from the frequency of the switching regulator's clock (which is typically generated internally but which might alternatively be provided externally), which causes the current in $L_{st}$ to increase and decrease at the switching frequency; some of this oscillation inevitably appears as a ripple component in $V_{out1}$ having a fundamental frequency equal to $f_{sw}$; and an inductor having an inductance $L_t$ and a capacitor having a capacitance $C_t$ connected in parallel to form a resonant circuit 16 having an associated notch filter frequency response. The switching voltage regulator and resonant circuit 16 are arranged such that, when connected to receive $V_{out1}$, the resonant circuit attenuates the ripple component, thereby producing the 'final' output voltage $V_{out2}$ which is then available to drive a load (represented by resistance $R_L$).

This is accomplished by ensuring that the resonant notch in the notch filter frequency response (alternately referred to herein as simply 'the resonant notch' or 'the notch') of resonant circuit 16 and the fundamental frequency of the ripple component are matched. A resonant circuit theoretically provides infinite attenuation at its resonant frequency. In practice, when the resonant notch and the fundamental frequency of the ripple are matched, the resonant circuit provides far more ripple attenuation than would the conventional alternative of a low pass filter; attenuation on the order of 30 db or more can be achieved. In addition, the $L_t$ and $C_t$ making up the resonant circuit can act in concert with one or more decoupling capacitors ($C_d$) coupled to the load ($R_L$) to form a low pass filter which attenuates harmonics of the ripple's fundamental frequency.

The resonant notch and the fundamental frequency of the ripple component can be matched manually or automatically. The matching can be done manually when the IC is being manufactured, by manually trimming the switching regulator clock frequency (from which switching frequency $f_{sw}$ is derived), resonant circuit inductance $L_t$, and/or resonant circuit capacitance $C_t$. As noted above, both switching regulator circuitry 12 and resonant circuit 16 are contained with the housing of IC 10. As such, the resonant notch and the fundamental frequency of the ripple component can be tuned to match each other during manufacture, and then the IC package sealed. Assuming that the clock is generated internally (and cannot be adjusted once the package is sealed), the final product provides an output voltage $V_{out2}$ with a strongly attenuated ripple component without further adjustment.

The resonant notch and the fundamental frequency of the ripple component can also be matched automatically, by providing a means to automatically trim the clock frequency, the resonant circuit inductance $L_t$, and/or the resonant circuit capacitance $C_t$ until matching is achieved. A resonant circuit has a useful property in that it causes a phase change in the frequency that passes through it. As the frequency is swept from DC upwards and the phase impact on the output side of the resonant circuit is measured, it is seen that there is a +90° phase shift at frequencies near DC, which gradually decreases until the frequency passes through the resonant circuit's resonant frequency. The phase shift starts to go negative for frequencies above the resonant frequency, and ends up at a maximum of −90°. Thus, inductance $L_t$ is dominant at low frequencies and capacitance $C_t$ is dominant at high frequencies. By measuring the phase difference through the resonant circuit, it can be determined when the frequency passing through the resonant circuit is seeing a 0° shift, and when the phase shift passes from positive to negative. This allows the exact resonant frequency of the resonant circuit to be detected.

Figure 2A:
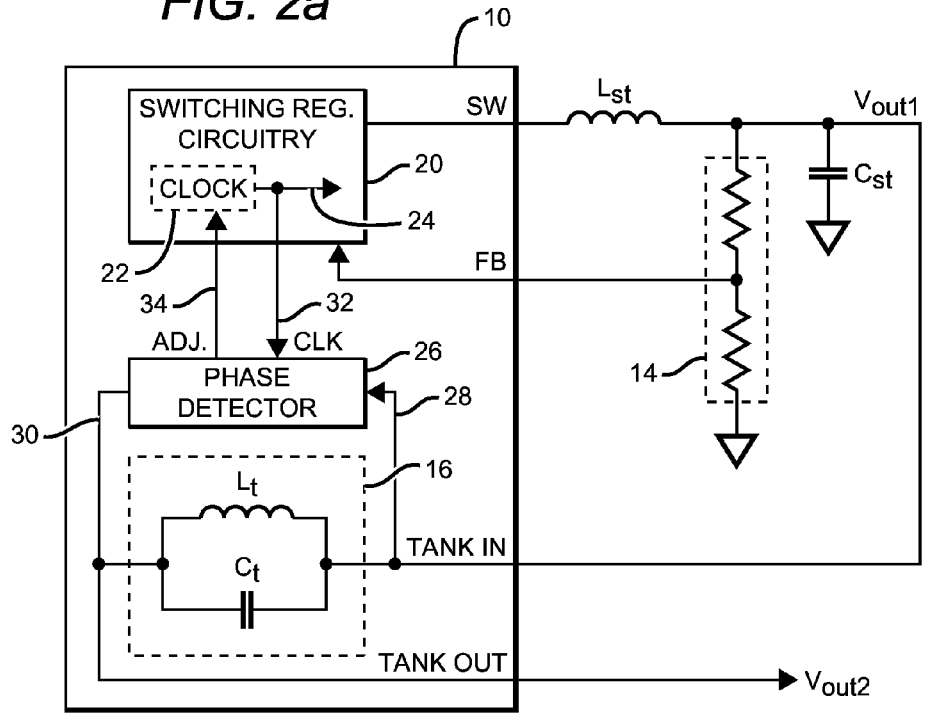
FIG. 2a is a block/schematic diagram of one possible embodiment of a switching regulator with an integrated resonant circuit per the present invention, arranged such that the regulator clock frequency is automatically trimmed.

This approach is implemented in FIG. 2a. Here, switching regulator circuitry 20 drives $L_{st}$ and receives feedback from divider 14 as before; the regulator would also typically include a clock circuit 22 which provides the regulator's clock signal 24. A phase detector circuit 26 is employed, which is coupled to the input and output of resonant circuit 16 at respective inputs 28 and 30, and to the regulator clock signal at an input 32. Phase detector circuit 26 is arranged to measure the phase difference through resonant circuit 16 and thereby determine its resonant frequency, and to generate an 'adjust' output (ADJ.) which varies with the difference between the resonant frequency and the frequency of the clock signal. When connected in a closed loop configuration, this signal can be used to trim one or more of the parameters that affect the match between the notch and the fundamental frequency of the ripple component, such as the frequency of the clock signal, inductance $L_t$ or capacitance $C_t$, until a match is achieved.

In the exemplary embodiment shown in FIG. 2a, the frequency of clock signal 24 can be adjusted via a control signal received at an input 34, which is connected to the 'adjust' output of phase detector circuit 26. Phase detector circuit 26, clock circuit 22, $V_{out1}$ and resonant circuit 16 form a closed loop, with the phase detector circuit arranged to adjust the frequency of clock signal 24 so as to drive the phase difference to zero—at which point the notch and the clock frequency are matched.

Figure 2B:
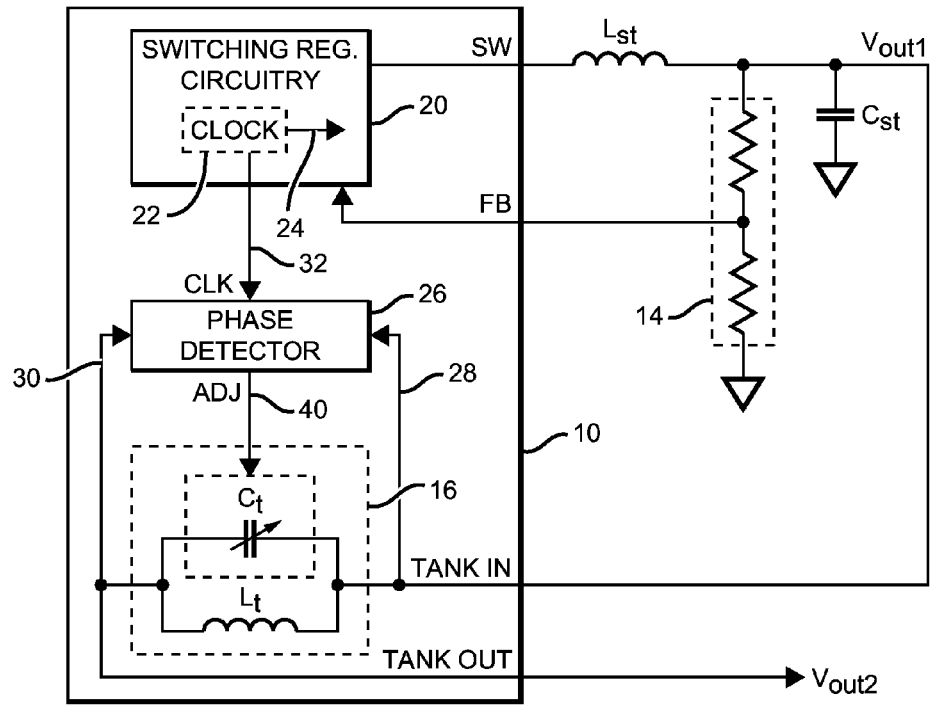
FIG. 2b is a block/schematic diagram of another possible embodiment of a switching regulator with an integrated resonant circuit per the present invention, arranged such that the resonant circuit capacitance is automatically trimmed.

Another possible arrangement is shown in FIG. 2b. Phase detector circuit 26 is again employed, coupled to the input and output of resonant circuit 16 at respective inputs 28 and 30, and to the regulator clock signal at input 32. In this example, resonant circuit 16 is made from an inductance $L_t$ and a variable capacitance $C_t$; $C_t$ varies in response to a control signal 40 which is connected to the 'adjust' output of phase detector circuit 26. Phase detector circuit 26, clock circuit 22, $V_{out1}$ and resonant circuit 16 form a closed loop, with the phase detector circuit arranged to adjust the capacitance $C_t$ so as to drive the phase difference to zero—at which point until the notch and the clock frequency are matched.

Variable capacitance $C_t$ is suitably a voltage controlled capacitor, such as a Barium Strontium Titanate (BST) capacitor. The BST capacitor would preferably be connected in series with a fixed capacitance; this is illustrated in FIG. 2c, which depicts just the resonant circuit 16 portion of FIG. 2b. When so arranged, the fixed capacitance acts as a DC block. A DC voltage can then be applied to the BST capacitor (via control signal 40, for example) to adjust its capacitance.

Figure 2D:
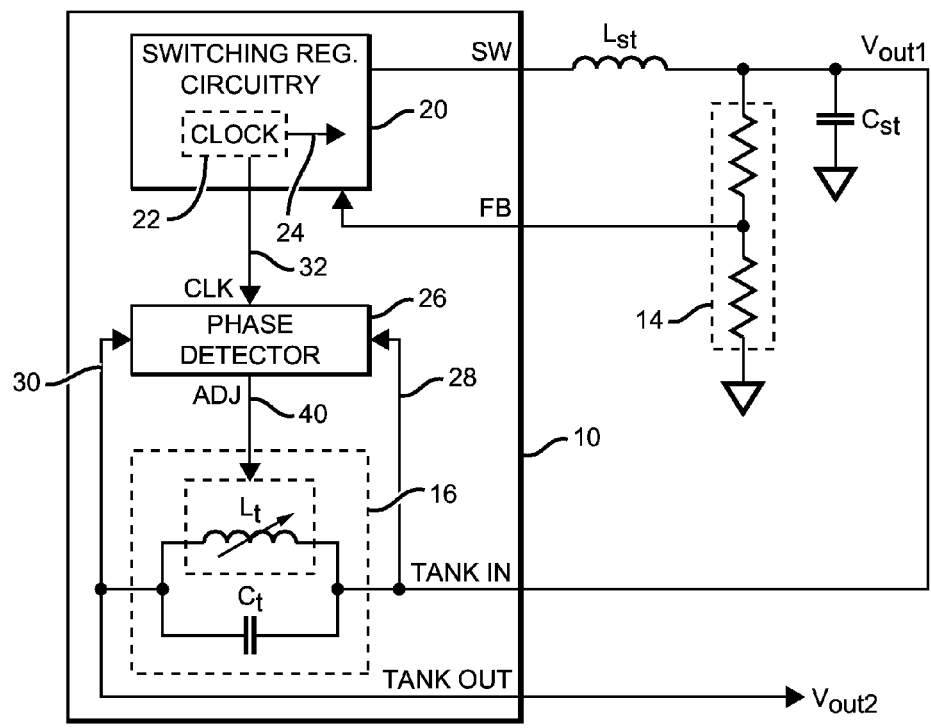
FIG. 2d is a block/schematic diagram of another possible embodiment of a switching regulator with an integrated resonant circuit per the present invention, arranged such that the resonant circuit inductance is automatically trimmed.
Figure 2C:
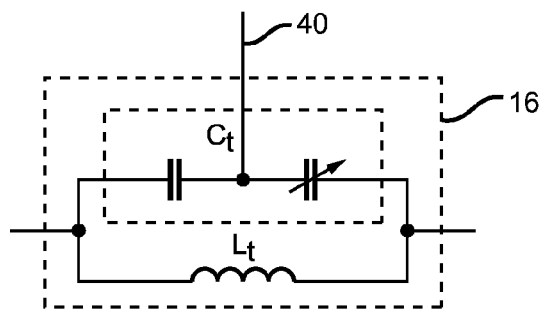
FIG. 2c is a schematic diagram of a resonant circuit as might be used with the present invention, which includes one possible implementation of a variable capacitance.

Another possible arrangement is shown in FIG. 2d. Phase detector circuit 26 is used as before, coupled to the input and output of resonant circuit 16 at respective inputs 28 and 30, and to the regulator clock signal at input 32. In this example, resonant circuit 16 is made from a capacitance $C_t$ and a variable inductance $L_t$; $L_t$ varies in response to control signal 40 connected to the 'adjust' output of phase detector circuit 26.

Phase detector circuit 26, clock circuit 22, $V_{out1}$ and resonant circuit 16 form a closed loop, with the phase detector circuit arranged to adjust the inductance $L_t$ so as to drive the phase difference to zero—at which point until the notch and the clock frequency are matched.

As noted above, the inductor and capacitor of the resonant circuit are housed within a common IC package with the switching regulator circuitry. The housing could be any form of integrated, self-contained package. For example, a laminate, module, single lead frame, or any other arrangement might be used, as long as it enables a customer to purchase the switching regulator die plus the resonant circuit in one package. This allows each IC package to contain a resonant circuit which is co-tuned to the regulator clock, whether the tuning is accomplished manually or automatically. In either instance, the resonant circuit and clock are "locked" together and thus the IC package is immediately ready to use.

Figure 3A:
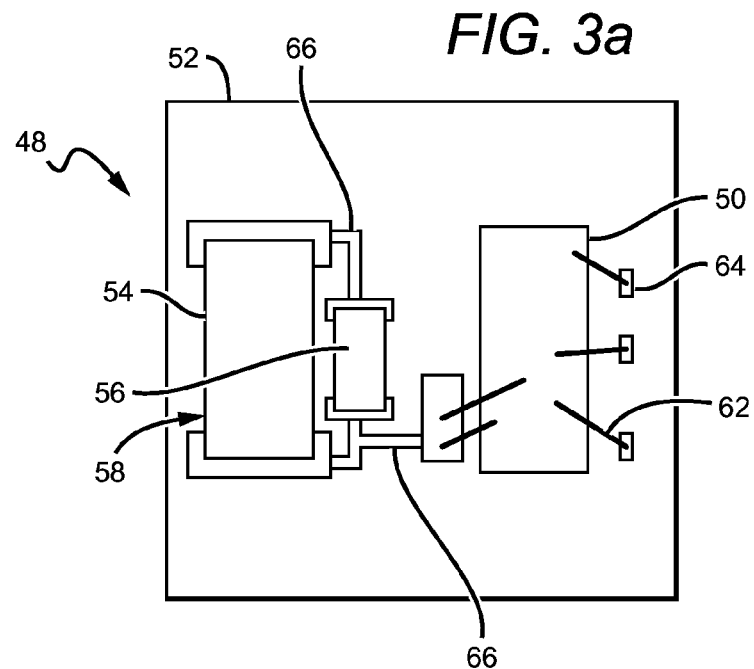
FIGS. 3a and 3b are plan and sectional views, respectively, of an IC packaging scheme as might be used with the present invention, which employs a laminate.
Figure 3B:
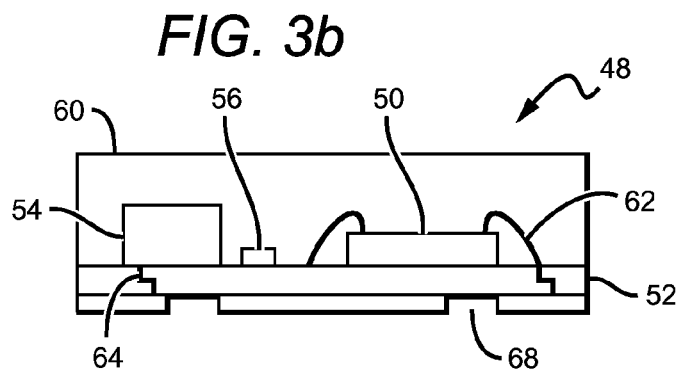

One possible implementation of an IC package 48 which employs the laminate approach is shown in the plan and corresponding sectional views of FIGS. 3a and 3b, respectively. Here, the switching regulator circuitry is fabricated on a first die 50, which is mounted to a laminate 52 along with the inductor 54 and capacitor 56 of the resonant circuit 58; the laminate is then encapsulated within, for example, a mold cap 60 (not shown in FIG. 3a). Wire bonds 62 connect the circuitry to the package's leads 64. Interconnect metal 66 could be used to connect inductor 54 to capacitor 56, and to switching regulator die 50. Pad/ball openings 68 could be used to effect connections between the IC package 48 and a PC board (not shown).

Figure 4A:
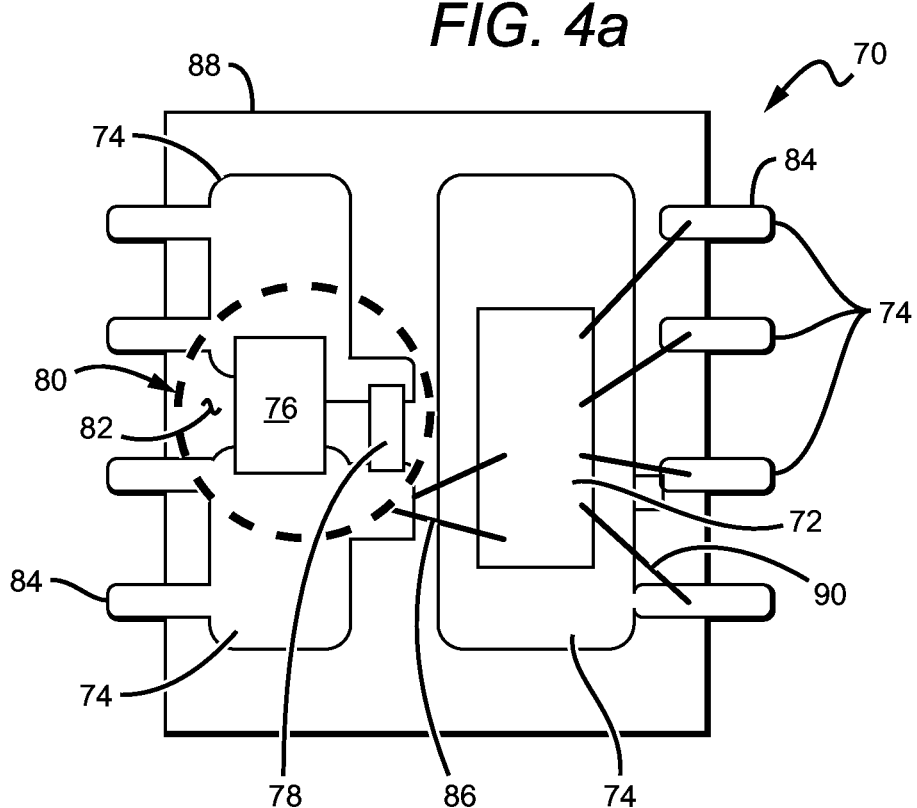
FIGS. 4a and 4b are plan and sectional views, respectively, of another IC packaging scheme as might be used with the present invention, which employs a lead frame.
Figure 4B:
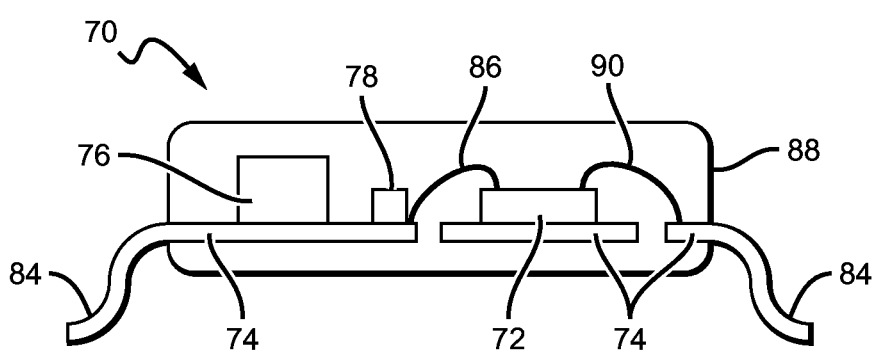

An implementation of an IC package 70 which employs the lead frame approach is shown in the plan and corresponding sectional views of FIGS. 4a and 4b, respectively. Here, the switching regulator circuitry is fabricated on a first die 72, which is affixed to a lead frame 74. The inductor 76 and capacitor 78 of the resonant circuit 80 are also affixed to lead frame 74. The lead frame may include gaps or slots 82 designed to accommodate the inductor and capacitor of the resonant circuit; such gaps may be, for example, etched, stamped or otherwise cut out of the lead frame. Inductor 76 and capacitor 78 may be soldered across the gap(s), and then interconnected to switching regulator die 72 and/or package leads 84 via bond wires 86 or a metallization pattern on the lead frame (not shown). The lead frame is then encapsulated within, for example, a mold cap 88. Additional bonds wires 90 effect interconnections between the switching regulator circuitry and package leads 84.

Another possible packaging scheme that might be employed is a module-type package, in which the switching regulator circuitry is fabricated on a first die and housed within a module with the inductor and capacitor of the resonant circuit (not shown). Many other possible packaging schemes might also be used. It is only essential that the switching regulator circuitry and the resonant circuit are housed within a common IC package and are arranged such that, when connected to receive the regulator's output voltage, the resonant circuit attenuates the output voltage's ripple component.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A switching regulator integrated circuit (IC), comprising:
    switching regulator circuitry arranged to produce an output which, when coupled to a storage inductor and storage capacitor, form a switching voltage regulator which produces an output voltage when in use, said output voltage including a ripple component having an associated fundamental frequency that varies with a frequency of a clock signal of the switching regulator circuitry;
    an inductor and a capacitor connected in parallel to form a resonant circuit having an associated notch filter frequency response that includes a resonant notch, said switching regulator circuitry and said resonant circuit housed within a common IC package;
    means for automatically trimming said clock signal frequency such that the resonant notch in said notch filter frequency response and said fundamental frequency are matched; and said switching voltage regulator and said resonant circuit arranged such that, when connected to receive said output voltage, said resonant circuit attenuates said ripple component;
means for automatically trimming said clock signal frequency such that the resonant notch in said notch filter frequency response and said fundamental frequency are matched.

2. The IC of claim 1, wherein said ripple component's fundamental frequency varies with the frequency of said clock signal, said means arranged to trim said clock signal frequency such that the resonant notch in said notch filter frequency response and the frequency of said clock signal are matched.

3. The IC of claim 2, wherein said means receives an input which varies with the phase difference through said resonant circuit, said means arranged to provide closed loop control of said clock signal frequency such that said clock signal frequency is trimmed as needed to drive said phase difference to zero.

4. The IC of claim 1, wherein the inductor and capacitor of said resonant circuit are discrete, surface mount components.

5. The IC of claim 1, wherein said switching regulator circuitry is fabricated on a first die, said first die and said inductor and capacitor of said resonant circuit mounted to a laminate which is housed within said common IC package.

6. The IC of claim 1, wherein said switching regulator circuitry is fabricated on a first die and said common IC package is a module-type package, said first die and said inductor and capacitor of said resonant circuit housed within said module.

7. The IC of claim 1, wherein said common IC package includes a lead frame, said switching regulator circuitry fabricated on a first die and affixed to said lead frame, said inductor and capacitor of said resonant circuit connected to said first die using bond wires.

8. The IC of claim 7, wherein said lead frame includes gaps designed to accommodate said inductor and capacitor of said resonant circuit.

9. The IC of claim 8, wherein said inductor and capacitor of said resonant circuit are soldered across said gaps.

10. The IC of claim 1, wherein said ripple component has an associated fundamental frequency, further comprising:
    a load which is driven with said switching voltage regulator; and
    one or more decoupling capacitors coupled to said load;
    wherein the inductor and capacitor of said resonant circuit form a single stage low pass filter with said decoupling capacitors which operates to attenuate the harmonics of said ripple component's fundamental frequency.

11. A switching regulator integrated circuit (IC), comprising:
- switching regulator circuitry arranged to produce an output which, when coupled to a storage inductor and storage capacitor, form a switching voltage regulator which produces an output voltage when in use, said output voltage including a ripple component having an associated fundamental frequency that varies with a frequency of a clock signal of the switching regulator circuitry; and
- an inductor and a capacitor connected in parallel to form a resonant circuit having an associated notch filter frequency response, wherein said capacitor is a variable capacitor and said switching regulator circuitry and said resonant circuit housed within a common IC package;
- said switching voltage regulator and said resonant circuit arranged such that, when connected to receive said output voltage, said resonant circuit attenuates said ripple component;

wherein said ripple component has an associated fundamental frequency, the capacitance of which is trimmed such that the resonant notch in said notch filter frequency response and said fundamental frequency are matched.

12. The IC of claim 11, wherein said capacitance is trimmed manually.

13. The IC of claim 11, further comprising a means for automatically trimming said capacitance such that the resonant notch in said notch filter frequency response and said fundamental frequency are matched.

14. The IC of claim 13, wherein said ripple component's fundamental frequency varies with the frequency of said clock signal, said means arranged to receive said clock signal at an input and to trim said capacitance in response such that the resonant notch in said notch filter frequency response and the frequency of said clock signal are matched.

15. The IC of claim 14, wherein said means receives an input which varies with the phase difference through said resonant circuit, said means arranged to provide closed loop control of said capacitance such that said capacitance is trimmed as needed to drive said phase difference to zero.

16. The IC of claim 11, wherein said variable capacitor comprises a voltage controlled capacitor.

17. The IC of claim 16, wherein said voltage controlled capacitor is a Barium Strontium Titanate (BST) capacitor.

18. The IC of claim 11, wherein said variable capacitor comprises a fixed capacitor connected in series with a voltage controlled capacitor.

19. A switching regulator integrated circuit (IC), comprising:
- switching regulator circuitry arranged to produce an output which, when coupled to a storage inductor and storage capacitor, form a switching voltage regulator which produces an output voltage when in use, said output voltage including a ripple component having an associated fundamental frequency that varies with a frequency of a clock signal of the switching regulator circuitry; and
- an inductor and a capacitor connected in parallel to form a resonant circuit having an associated notch filter frequency response, wherein said inductor is a variable inductor and said switching regulator circuitry and said resonant circuit housed within a common IC package;
- said switching voltage regulator and said resonant circuit arranged such that, when connected to receive said output voltage, said resonant circuit attenuates said ripple component;

wherein said ripple component has an associated fundamental frequency, the inductance of which is trimmed such that the resonant notch in said notch filter frequency response and said fundamental frequency are matched.

20. The IC of claim 19, wherein said inductance is trimmed manually.

21. The IC of claim 19, further comprising a means for automatically trimming said inductance such that the resonant notch in said notch filter frequency response and said fundamental frequency are matched.

22. The IC of claim 21, wherein said ripple component's fundamental frequency varies with the frequency of said clock signal, said means arranged to receive said clock signal at an input and to trim said inductance in response such that the resonant notch in said notch filter frequency response and the frequency of said clock signal are matched.

23. The IC of claim 22, wherein said means receives an input which varies with the phase difference through said resonant circuit, said means arranged to provide closed loop control of said inductance such that said inductance is trimmed as needed to drive said phase difference to zero.

\* \* \* \* \*